US 009686007 B2

(12) United States Patent
Braz et al.

(10) Patent No.: US 9,686,007 B2
(45) Date of Patent: Jun. 20, 2017

(54) WIRELESS COMMUNICATION NETWORK USING FREQUENCY CONVERSION OF MIMO SIGNALS

(71) Applicant: Andrew Wireless Systems GmbH, Buchdorf (DE)

(72) Inventors: Oliver Braz, Monheim (DE); Alfons Dussmann, Gansheim (DE); Luigi Tarlazzi, Bagnacavallo (IT); Thomas Haustein, Potsdam (DE); Thomas Wirth, Berlin (DE); Dennis Wieruch, Berlin (DE); Friedrich Jondral, Karlsruhe (DE); Holger Jakel, Karlsruhe (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

(21) Appl. No.: 14/364,786

(22) PCT Filed: Dec. 6, 2012

(86) PCT No.: PCT/EP2012/005029
§ 371 (c)(1),
(2) Date: Jun. 12, 2014

(87) PCT Pub. No.: WO2013/087166
PCT Pub. Date: Jun. 20, 2013

(65) Prior Publication Data
US 2015/0207558 A1 Jul. 23, 2015

(30) Foreign Application Priority Data
Dec. 13, 2011 (DE) .................. 10 2011 120 827

(51) Int. Cl.
*H04B 7/145* (2006.01)
*H04B 7/04* (2006.01)
(Continued)

(52) U.S. Cl.
CPC .......... *H04B 7/145* (2013.01); *H04B 7/0413* (2013.01); *H04B 7/15542* (2013.01); *H04W 72/0453* (2013.01); *H04B 7/2606* (2013.01)

(58) Field of Classification Search
None
See application file for complete search history.

(56) References Cited

U.S. PATENT DOCUMENTS 5,192,924 A * 3/1993 Agahi-Kesheh ..... H03H 7/0123
333/175
6,738,599 B2 5/2004 Black et al.
(Continued)

FOREIGN PATENT DOCUMENTS

CN 1790943 6/2006
DE 102009052936 A1 * 5/2011 .......... H04W 88/085
(Continued)

OTHER PUBLICATIONS

Yulong Zou, et al. "Spectrum efficiency of cognitive relay transmissions with cooperative diversity in cognitive radio networks", Communication Systems, Networks and Applications (ICCSNA), 2010 Second International Conference on, IEEE, Piscataway, NJ, US, Jun. 29, 201 (Jun. 29, 2010), Seiten 59-62, XP031765544, ISNB: 978-1-4244-7475-2.
(Continued)

*Primary Examiner* — Ayaz Sheikh
*Assistant Examiner* — Tarell Hampton
(74) *Attorney, Agent, or Firm* — Fogg & Powers LLC

(57) ABSTRACT

Communication network (100) for wireless communication, comprising a base station (1, 16, 26), a wireless terminal (3, 15, 18, 25, 37) and at least one repeater (5, 10, 20, 28, 33) which is connected between the base station (1, 16, 26) and the wireless terminal (3, 15, 18, 25, 37), the base station (1,
(Continued)

16, 26) being configured for transmitting and receiving a communication signal on multiple information channels, the terminal (3, 15, 18, 25, 37) being configured for transmitting and receiving a communication signal on multiple information channels, and the repeater (5, 10, 20, 28, 33) being configured for receiving, passing through and retransmitting communication signals on multiple information channels, and contains a converting device (101, 103, 106, 110, 118) for frequency conversion of at least one information channel passed through, a test receiver (6, 12, 22, 34, 38) being additionally comprised which is configured for determining unused frequency ranges for wireless communication, the test receiver (6, 12, 22, 34, 38) being connected to the converting device (101, 103, 106, 110, 118) of the repeater (5, 10, 20, 28, 33), the converting device (101, 103, 106, 110, 118) being configured for carrying out the frequency conversion in at least one communication direction (UL, DL) to a frequency from the unused frequency ranges, and the repeater (5, 10, 20, 28, 33) being configured for transmitting the communication signal wirelessly with the at least one frequency-converted information channel in the at least one communication direction.

17 Claims, 5 Drawing Sheets

(51) Int. Cl.
*H04W 72/04* (2009.01)
*H04B 7/155* (2006.01)
*H04B 7/0413* (2017.01)
*H04B 7/26* (2006.01)

(56) References Cited

U.S. PATENT DOCUMENTS

| | | | |
|---|---|---|---|
| 6,882,851 B2 | 4/2005 | Sugar et al. | |
| 7,110,366 B2 | 9/2006 | Hulyalkar et al. | |
| 7,146,176 B2 | 12/2006 | McHenry | |
| 7,200,404 B2 | 4/2007 | Panasik et al. | |
| 7,408,907 B2 | 8/2008 | Diener | |
| 8,121,058 B2 | 2/2012 | Kattwinkel | |
| 8,326,227 B2 | 12/2012 | Zhou et al. | |
| 8,472,868 B2 | 6/2013 | Mu et al. | |
| 8,902,812 B1* | 12/2014 | Johnson | H04J 3/1694 370/328 |
| 2002/0065094 A1* | 5/2002 | Schmutz | H04B 7/15535 455/522 |
| 2004/0057543 A1* | 3/2004 | Huijgen | H04J 3/0682 375/356 |
| 2006/0084444 A1* | 4/2006 | Kossi | H04W 84/18 455/450 |
| 2006/0126752 A1* | 6/2006 | Hansen | H04B 7/0417 375/267 |
| 2007/0049295 A1* | 3/2007 | Soliman | G01S 5/0252 455/456.3 |
| 2007/0058742 A1 | 3/2007 | Demarco et al. | |
| 2009/0325482 A1 | 12/2009 | Zhou et al. | |
| 2010/0284446 A1* | 11/2010 | Mu | H04B 7/15521 375/211 |
| 2011/0090841 A1 | 4/2011 | Shyy et al. | |
| 2011/0122840 A1 | 5/2011 | Kim | |
| 2011/0194503 A1* | 8/2011 | Stanforth | H04W 16/14 370/329 |
| 2011/0287791 A1* | 11/2011 | Fujishima | H04B 7/061 455/500 |
| 2012/0058794 A1* | 3/2012 | Valentine | H04W 48/10 455/513 |
| 2012/0213061 A1* | 8/2012 | Chen | H04W 16/14 370/227 |
| 2013/0077604 A1* | 3/2013 | Chen | H04W 4/00 370/336 |
| 2013/0176934 A1* | 7/2013 | Malladi | H04W 56/001 370/315 |

FOREIGN PATENT DOCUMENTS

| | | |
|---|---|---|
| WO | 2010120149 | 10/2010 |
| WO | 2013087166 A1 | 6/2013 |

OTHER PUBLICATIONS

International Search Authority, "International Search Report for PCT Application No. PCT/EP2012/005029", Mar. 18, 2013, pp. 17, Published in: WO.

International Preliminary Examining Authority, "International Preliminary Report on Patentability for PCT Application No. PCT/EP2012/005029", Feb. 3, 2014, pp. 1-25, Published in: WO.

State Intellectual Property Office of the People'S Republic of China, "Notification of the First Office Action for Application No. 201280067809.5", "from U.S. Appl. No. 14/364,786", Sep. 8, 2016, pp. 1-30, Published in: CN.

* cited by examiner

WIRELESS COMMUNICATION NETWORK USING FREQUENCY CONVERSION OF MIMO SIGNALS

RELATED APPLICATIONS

This application is a National Application of, and claims priority to, International Publication Number WO2013/087166, filed Dec. 6, 2012, entitled "WIRELESS COMMUNICATIONS NETWORK", which claims priority to German Application Serial No. DE 10 2011 120827.9, filed Dec. 13, 2011, entitled "WIRELESS COMMUNICATIONS NETWORK", which applications are each incorporated herein by reference in their entireties.

BACKGROUND AND DESCRIPTION OF THE INVENTION

The invention relates to a communication network for wireless communication, comprising a base station, a wireless terminal and at least one repeater which is connected between the base station and the wireless terminal. In this arrangement, the base station and the terminal are configured for transmitting and receiving a communication signal on multiple information channels. The repeater is configured for receiving, passing through and retransmitting communication signals on multiple information channels. The communication network also comprises a converting device for frequency conversion of at least one information channel passed through.

In particular, the communication network can be a network within a mobile radio network. The terminal is, for example, a mobile terminal, particularly a mobile telephone.

The repeater can be constructed, for example, as a bidirectional radio-frequency amplifier which distributes, that is to say receives, the communication signals within the communication network, amplifies them during the passing-through, filters them and transmits them again. Such a repeater is used, in particular, for providing for communication between the base station and the terminal in shading areas of a wireless network such as exist, for example, at the transition from an outdoor area into an indoor area of a building. However, the amplification function is basically not required for the communication network presented here. The repeater can be equipped for a bidirectional wireless transmission and for a bidirectional wireless reception of the communication signals. However, the repeater can also transmit and/or receive the communication signals in a wire-connected manner at least in one communication direction. In this context, the communication directions are spoken of as being in a downlink direction if communication signals are conveyed in the direction of the terminal and in an uplink direction if communication signals are conveyed in the direction of the base station.

A communication network of the type initially mentioned is known, for example, from US 2010/0284446 A1. In this paper, a frequency conversion of the communication signals is carried out between the repeaters in a multi-hop chain of repeaters in order to avoid interferences between the communication signals of a terminal and the communication signals exchanged between the repeaters. The frequency spectrum used for communication between the repeaters is arranged outside the communication band assigned for communication between base station and terminal.

A communication network of the type initially mentioned is also known from US 2009/0190508 A1. In this network, a frequency conversion is carried out in a repeater in order to be able to utilize free frequencies which are currently not occupied by the primary user and are available within a communication band assigned for primary users.

In principle, the continuously increasing demand for mobile data services leads to an increasing requirement for transmission capacity. Due to the limited bandwidth available for mobile applications, technologies have been increasingly developed in recent years which provide for a multiple utilization of this resource. It has thus been possible to utilize the spatial diversity of the transmission channel by using multi-antenna systems in conjunction with novel space/time coding methods (MIMO—Multiple Input Multiple Output). These technologies can be used particularly efficiently in highly dispersive environments as can be found, for example, in the interior of buildings or in closed cabins. It was possible to establish here that the transmission capacity can be increased approximately linearly with the number of antennas. It is of significance in this context that the spatially different transmission paths are not correlated to one another or are so as little as possible, respectively.

In supplying relatively large radio cells in the outdoor area, significant increases in the data rates can only be achieved with two antennas arranged to be cross-polar, particularly with a direct line of sight (LOS) between the communication partners. The results achieved with other configurations (NLOS—Non Line Of Sight), particularly with more than two antennas, frequently do not justify the costs for the infrastructure becoming additionally necessary. One main reason for these unsatisfactory results is based on the small angular spread and the resultant strong correlation of the communication signals of different antennas in the outdoor area.

It is the object of the invention to improve a communication network of the type initially mentioned with regard to its transmission capacity by utilizing the existing resources.

This object is achieved for a communication network of the type initially mentioned in accordance with the invention in that a test receiver is additionally comprised which is configured for determining unused frequency ranges for wireless communication, in that the test receiver is connected to the converting device of the repeater, in that the converting device is configured for carrying out the frequency conversion in at least one communication direction to a frequency from the unused frequency ranges, and in that the repeater is configured for transmitting the communication signal wirelessly with the at least one frequency-converted information channel in the at least one communication direction.

In this context, the invention is based in a first step on the approach, discussed for example in M. Mück et al., "ETSI reconfigurable radio systems: status and future directions on software defined radio and cognitive radio standards, IEEE Communications Magazine, September 2010, pp. 78-86, of a so-called cognitive radio system by means of which free unused frequency ranges are to be made accessible in the frequency spectrum suitably usable particularly for mobile applications in the outdoor area. In this context, an essential concept consists in determining the actual utilization of the available radio resources, for example with the aid of distributed sensors, and to decide centrally about their efficient utilization. For this purpose, the individual devices exchange information on the frequencies with which the information channels are transmitted in each case, the choice of the respective frequency being dependent on the available radio resources in time or in location, that is to say being carried out "cognitively". Methods which determine the local utilization of the available frequency spectrum by measurements are presented, for example, in U.S. Pat. No. 6,882,851 B2 or U.S. Pat. No. 7,146,176 B2. The use of a relevant central database is proposed in U.S. Pat. No. 7,200,404 B2.

In a second step, the invention is based on the consideration that with respect to the frequency range suitably usable for mobile applications in the outdoor area, between 400 MHz (below that, the antenna structures needed become too large) and 3000 MHz (above that, the propagation attenuation becomes too great), only a small proportion is actually available for mobile radio. The remaining ranges are utilized either only regionally, e.g. terrestrial television, only locally, e.g. in-house WLAN, or limited in time, e.g. radar, and thus very inefficiently.

In a third step, the invention is finally based on the further consideration of utilizing the radio-frequency ranges, which, in principle, are usable for wireless communication, for the exchange of the communication signals within a wireless communication network in order to improve its transmission capacity. In other words, multiple information channels are transmitted by utilizing free radio frequencies, so-called "white spaces", cognitively distributed to various frequencies so that the transmission capacity can be increased intelligently. In particular, this procedure makes it possible to use frequencies outside the frequency bands assigned for mobile radio so that additional resources can be included. In particular, it is not necessary to use frequencies within the frequency bands assigned for mobile radio. In this manner, the capacity limit of a communication network can be overcome which is provided by an only limited possibility of utilizing the "fully" occupied communication bands of the mobile communication.

In other words, the invention makes it possible, particularly for communication signals which are already transmitted on multiple information channels, to use resources outside the frequency band assigned in each case for wireless communication. If, for example, the MIMO technology is used for increasing the transmission capacity in an outdoor area, that is to say the communication signal is transmitted by means of spatially multiple information channels and a number of antennas, the repeater used for the communication network specified here can be configured for cognitively converting the equal-frequency MIMO signals to different frequencies, and wirelessly transmitting them, by utilizing free frequencies. In this context, the signal coding used for MIMO signals is retained so that the signals, after a corresponding frequency reconversion, can be transmitted again as equal-frequency MIMO signals via a number of antennas. Due to the fact that the MIMO signals are transmitted frequency-converted by utilizing free frequencies via the air interface, however, the unwanted restriction of the transmission capacity due to correlation of the MIMO signals transmitted in parallel is not applicable in the outdoor area.

In particular, the invention is also suitable for wirelessly transmitting MIMO signals wirelessly frequency-converted in the outdoor area by utilizing free frequency bands and for transmitting them again as MIMO signals after frequency reconversion via various antennas in an indoor area in which the advantages of the MIMO technology can be fully exploited.

The use of the invention is associated with further advantages for feeding MIMO signals into a mobile umbrella cell such as, for example, the internal space of a travelling train. With such a technology, a further impairment of the data throughput can be expected (apart from the unwanted restriction by correlation of the MIMO signals in the outdoor area). This is because it has been found that the frequency offset increasing with increasing speed of the mobile umbrella cell additionally impairs the desired decorrelation of the equal-frequency MIMO signals due to Doppler shift. Presently known methods for correcting this effect only allow a modulation rate of the mobile system.

If, in particular, a MIMO-capable repeater is used for coupling into the umbrella cell which receives MIMO signals cognitively converted in the downlink direction to various frequencies, frequency-converts these or at least one of these MIMO signals again and radiates them as equal-frequency MIMO signals into the internal space, the disadvantages associated with the Doppler effect when utilizing the MIMO technology are overcome.

The presently used term of a converting device combines those components of a corresponding assembly which are necessary for a frequency conversion of a communication signal passing through. In particular, this also comprises a frequency mixer which is occasionally described separately to a converting device.

In a preferred embodiment, the base station comprises a further converting device for frequency conversion which is connected to the test receiver and is configured for carrying out the frequency conversion in the downlink direction to a frequency from the unused frequency ranges, the converting device of the at least one repeater being configured for reconverting, particularly resetting, the frequency of the frequency-converted information channel in the downlink direction, and carrying out the frequency conversion of the at least one information channel into the frequency from the unused frequency ranges in the uplink direction.

In the aforementioned case, the base station, for example, is constructed as a cognitive base station which already exchanges communication signals at different frequencies to the said free frequencies for increasing the transmission capacity. To be able to process these frequencies, converted cognitively spatially, temporally or locally variably, of the various information channels, a cognitive terminal is basically necessary which operates "synchronized" with the base station with regard to the frequencies used via its own test receiver. However, the introduction of such terminals and such base stations is associated with a high cost expenditure and the establishment of an additional infrastructure.

However, if the repeater is configured in the sense of the present invention to reconvert the frequency of the frequency-converted information channel in the downlink direction and to carry out the frequency conversion of the at least one information channel into the frequency from the unused frequency ranges in the uplink direction, by means of the implemented converting device, no cognitive terminal for information exchange is necessary. Instead, the repeater handles the transformation of a cognitive communication network for the terminal in this case. The terminal can then be, for example, a MIMO or multi-frequency terminal which has two or more antennas or operates on two or more mobile radio bands, respectively, which corresponds to the current state of the art.

In the aforementioned variant of the embodiment, the cognitive base station is enabled, in particular, for example on the request of the repeater, to code the communication signals sent out on multi-frequency information channels in accordance with the MIMO method. In this case, the repeater with high transmission capacity on multi-frequency information channels receives a MIMO-coded communication signal. This MIMO-coded communication signal is then reconverted with regard to the frequencies for a MIMO-capable terminal and radiated as MIMO signal having at least two locally multiple equal-frequency information channels on at least two or more antennas. In this case, the invention utilizes, for example in the outdoor area, a multi-frequency cognitive data transmission in order to use the MIMO technology with high transmission capacity for the terminal, particularly in an indoor area.

In a further variant of the embodiment, between the base station and terminal, at least two repeaters are comprised which are configured for receiving, passing through and retransmitting communication signals on multiple information channels and which in each case contain a converting device, connected to the test receiver, for frequency conversion of at least one information channel passed through in at least one communication direction to a frequency from the unused frequency ranges, the converting device of the repeater on the base station side being configured for carrying out the frequency conversion of the at least one information channel to the frequency from the unused frequency ranges in the downlink direction and reconverting, particularly resetting, the frequency of the frequency-converted information channel in the uplink direction, and the converting device of the repeater on the terminal side being configured for reconverting, particularly resetting, the frequency of the frequency-converted information channel in the downlink direction, and carrying out the frequency conversion of the at least one information channel to the frequency from the unused frequency ranges in the uplink direction.

In other words, two repeaters which communicate wirelessly with one another via a respective air interface are provided in this advantageous variant of the embodiment. Cognitive information transmission is used for this wireless communication. The repeater on the base station side receives the multiple information channels of the base station, cognitively converts these information channels to the free frequencies and transmits them wirelessly. The repeater on the terminal side receives the cognitively converted multi-frequency information channels wirelessly, correspondingly resets the frequencies of the information channels and transmits the signals, for example as multiple information channels, on the assigned communication band of the base station. The repeaters exchange their functionality for the uplink direction, i.e. of a communication of the terminal in the direction of the base station. Here, as also in the variants of the embodiment described previously, it is not necessary for the inventions that the repeater or the converting device, respectively, returns the cognitively converted frequencies into the original frequencies. It is also possible to convert the cognitively frequency-offset information channels into other frequencies than those of the communication band of the base station.

As mentioned, the base station is suitably a MIMO-capable base station and is configured for transmitting and receiving a communication signal on spatially multiple information channels, the repeater on the base station side being configured as a MIMO-capable repeater and thus being capable of transmitting spatially multiple information channels in the uplink direction and receiving spatially multiple information channels in the downlink direction. In other words, the repeater on the base station side communicates with the base station in the MIMO technology. On the terminal side, the repeater communicates on the information channels cognitively offset in frequency. A second repeater communicates with the first repeater on the information channels cognitively offset in frequency. On the terminal side, this second repeater communicates with the terminal in accordance with MIMO technology.

In the aforementioned variant of the embodiment, the repeater on the base station side is suitably connected to the base station, particularly to the antenna feed lines, via bidirectional couplers, the communication signals being exchanged optically or electrically with the base station. In this case, the communication signals coded, for example, for MIMO are exchanged in wire-connected manner with the base station.

The terminal is suitably also a MIMO-capable terminal which is configured for transmitting and receiving a communication signal on spatially multiple information channels, the at least one or terminal-side repeater being a MIMO-capable repeater which is configured for transmitting spatially multiple information channels in the downlink direction and receiving spatially multiple information channels in the uplink direction.

Also preferred, a test receiver is allocated to the or each converting device, the test receivers being connected to one another and "synchronized" with regard to the frequency to be selected for the frequency conversion. This results in a cognitive communication network, the respective converting devices and repeaters exchanging the respective selected frequencies from the free frequency ranges with one another via the test receivers so that the necessary information for frequency conversion and resetting the frequency, respectively, is present in each case.

In another preferred embodiment, the communication network comprises a multiband transmission system with a master unit and at least one remote unit connected to the master unit via a common signal line, the master unit being constructed for transmitting and for receiving the communication signals on multiple information channels and for connecting or decoupling the multiple information channels to a or from a transmission signal, the transmission signal being conducted via the common signal line, and the at least one or terminal-side repeater being constructed as a component of the remote unit. Such a multiband transmission system can be found, e.g., in DE 10 2009 052 936 A1.

In this variant of the embodiment, communication signals are exchanged with the base station, for example via an air interface of the master unit. The multiple information channels are individually frequency-converted with other information channels such as, e.g., from a digital network or the like, if necessary for avoiding interferences, and exchanged between the master unit and the remote units via a common signal line. In this arrangement, the common signal line is, for example, constructed to be electrical or optical so that losses due to spark transmission are avoided. At the remote units, the various multiple information channels are reset in their frequency and transmitted wirelessly. In one variant of the embodiment, the multiband transmission system transmits in particular the information channels cognitively converted in frequency, the transformation of the cognitive frequency-offset information channels taking place in the remote unit. Synchronization with regard to the cognitive frequency conversion can take place, in particular, via the converting device integrated in the remote unit, which can also be connected to a digital network via the common signal line.

For a cognitive network to work, as simple as possible a coordination with other radio services which, in particular, are released for primary users must be aimed for. To eliminate disturbances in the frequency range of these primary users, a central controller is used alternatively or additionally to a metrological checking of the availability ("listen before talk") of potentially free, that is to say unused, frequency bands in a preferred embodiment. In particular, the cognitive interaction of one or more repeaters with one or more base stations is suitably coordinated in the network.

For this purpose, the or each test receiver of the communication network specified is connected in an advantageous embodiment of the communication network to a central database in which the frequency ranges unused for wireless communication are stored. For this purpose, the test receivers are advantageously equipped in each case with a modem which are connected wirelessly or cable-connected to one another and/or to this central cognitive database. A wireless modem is, for example, a GSM, UMTS or LTE modem. A cable-connected modem can be, for example, an ISDN, DSL or LAN modem. From this database, the test receivers can call up the locally or temporarily free unused frequency ranges and thus carry out the respective cognitive frequency conversion of the information channels by means of the respective converting devices. Conversely, the respective test receivers of the communication network can also deposit the selected frequencies for the other test receivers in the central database where they are made available retrievably.

In an embodiment also suitable for this purpose, the or each test receiver is equipped with a spectrum analyser. This can detect, for example, the locally or temporarily free unused frequency ranges and deposit the information obtained in the central database. The individual test receivers of the communication network thus virtually represent sensors of a cognitive wireless network.

It is especially when the communication network is used for transmission in a mobile umbrella cell that the metrologically supported coordination of the spectrum utilization has a special significance since in this case supply regions of different primary user services may be passed. If GPS data are additionally used or also recorded by the spectrum analyser, the database can also advantageously be fed with spatially resolved information about the spectrum utilization.

The or each converting device is advantageously configured for carrying out no frequency conversion for at least one of the information channels. This makes it possible to save computing capacity and equipment expenditure.

To avoid any feedback of the transmitted communication signal with the communication signal passing through, the or each repeater is optionally equipped with electronic means for suppressing the feedback. The means for suppressing a feedback suitably comprise a digital adaptive filter. For this purpose, a part of the transmitted communication signal is fed back to the adaptive filter and thus its transfer function is changed. At the digital level, this suppresses feedback components in the communication signal passing through.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention. Parts and variables corresponding to each other are in all figures always identified by the same reference numbers.

Illustrative embodiments of the invention will be explained in greater detail with reference to a drawing, in which.

DETAILED DESCRIPTION OF THE EMBODIMENTS OF THE INVENTION

Figure 1:
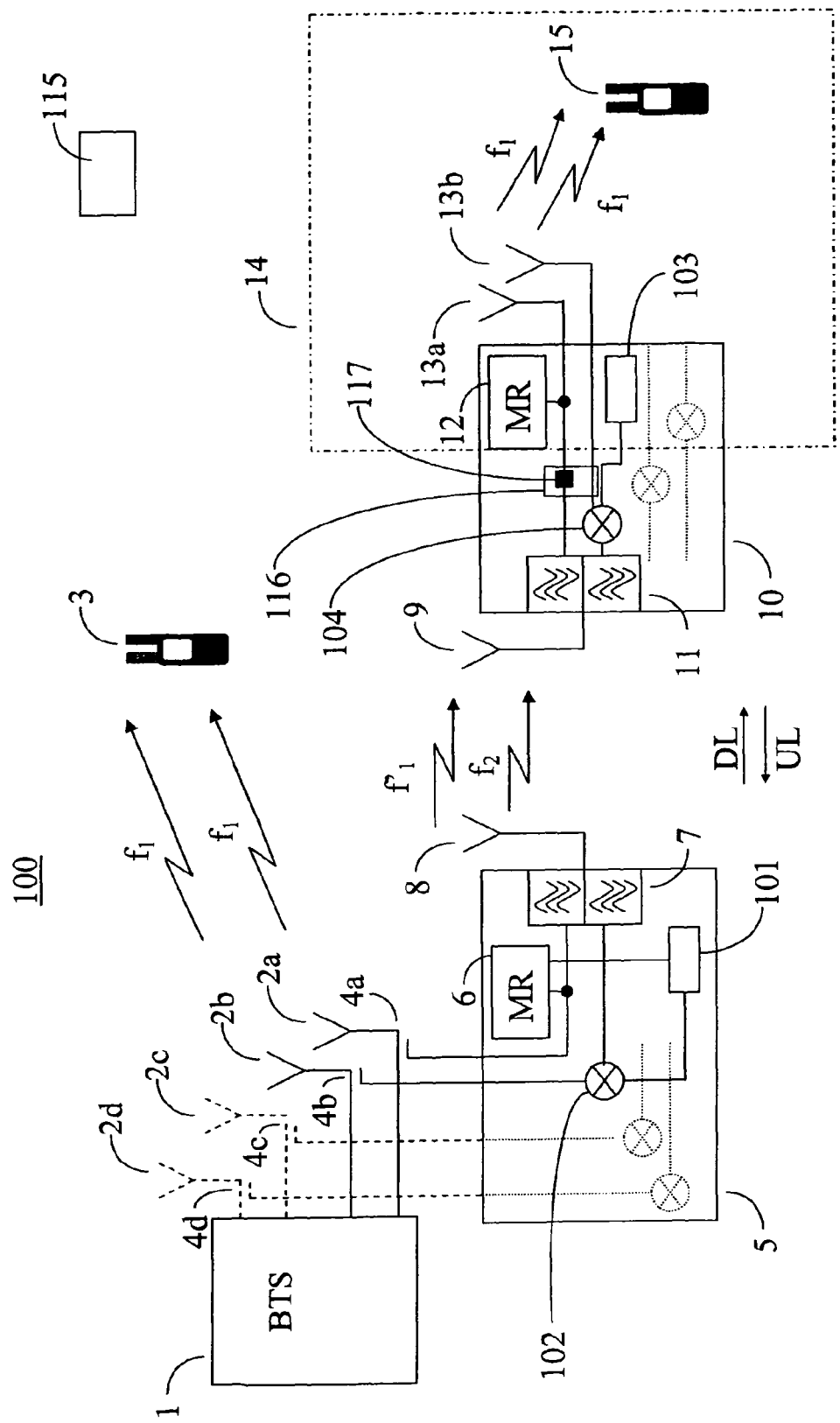
FIG. 1: diagrammatically shows a communication network with a MIMO-capable base station, a MIMO-capable terminal and two repeaters which communicate with one another wirelessly on information channels cognitively offset in frequency.

FIG. 1 diagrammatically shows a communication network 100 with a MIMO-capable base station 1, a MIMO-capable terminal 3, a MIMO-capable terminal 15 and two repeaters 5, 10. In this arrangement, the transmission path of the communication signals is shown in the downlink direction DL for the sake of clarity. The embodiments shown can be correspondingly transferred to the transmission of the communication signals in the uplink direction UL. The utilization of MIMO transmission techniques in the uplink direction UL is currently not a component of MIMO-capable mobile communication networks. However, the utilization of MIMO transmission techniques in the uplink direction UL will be a firm component of future revisions.

To utilize the MIMO transmission technique, the base station 1 and the terminals 3, 15 in each case have at least two antennas for the communication within a frequency band assigned for a mobile network. The corresponding two antennas 2a and 2b are identified for the base station 1. The further two antennas 2c and 2d are provided for the utilization of the 4×4 or 4×2 MIMO technology which will also be the subject matter of future revisions.

Via the several, presently two, antennas 2a, 2b of the base station 1 and of the terminals 3, 15, respectively, communication signals are transmitted on equal-frequency spatially multiple (presently two) information channels in accordance with the MIMO technology. In this arrangement, several antennas increase the transmission capacity. The application of the MIMO technology is an essential component in mobile radio systems of the fourth generation (4G). These systems include, for example, the spread-code-based HSPA+ (High Speed Packet Access) method, CDMA (Code Division Multiple Access) and the WLAN, WiMAX and LTE methods (Long Term Evolution) based on orthogonal frequency multiplexing (OFDM: Orthogonal Frequency Division Multiplexing).

According to FIG. 1, the MIMO-capable base station radiates communication signals on spatially multiple equal-frequency information channels via the at least two antennas 2a, 2b. In this arrangement, the frequency is designated by $f_1$ in FIG. 1. MIMO-capable terminals 3 located in the coverage area of the base station 1 can thus establish a direct radio connection. In parallel with this optional direct connection between the MIMO-capable base station 1 and the MIMO-capable terminal 3, a part of the MIMO signals is retrieved on the antenna feed lines of the base station 1 by means of bidirectional couplers 4a, 4b and forwarded to a repeater 5. In deviation from the cable-conducted linkage shown here, a linkage via directional antennas is also conceivable for the repeater 5.

The repeater 5 comprises a test receiver 6 which is connected to a converting device 101. The converting device 101 also comprises an associated frequency mixer 102 and is capable of converting the communication signals passing through the repeater 5 in their frequency.

The test receiver 6 comprises a spectrum analyser which is capable of analysing the locally and temporally free frequency ranges usable for mobile radio. Additionally or as an alternative, the test receiver 6 is equipped as a wireless or cable-connected modem and is connected to a central database 115 which provides free frequency ranges available locally or temporarily for a mobile radio communication. On the basis of the spectrum information of the test receiver 6, one of the two MIMO information channels is offset in frequency by means of the converting device 101 and the frequency mixer 102. The frequency is offset here into a range of the spectrum which is outside the mobile radio band of the base station 1. In particular, this frequency range can be in the frequency band provided for terrestrial television. In the embodiment shown in FIG. 1, one information channel remains in its original frequency position.

The information channel remaining in the frequency is radiated with the further information channel displaced cognitively in its frequency by means of the test receiver 6 jointly via an antenna 8 via the air interface of the repeater 5 after passing through a combiner or multiplexer 7. The cognitively converted MIMO signals are now designated by the frequencies $f_1'$ and $f_2$. In another embodiment, the radiation can also be carried out via antennas in each case separately allocated to the frequencies.

After the wireless transmission of the frequency-converted original MIMO signals, these are received by means of the antenna 9 of a second repeater 10. The two frequencies are separated in a multiplexer 11. The reception of both information channels, different in frequency, via separately allocated antennas is also possible for the repeater 10 as an alternative.

The repeater 10 also comprises a test receiver 12 which is connected to a converting device 103 with frequency mixer 104. On the basis of the spectrum information and information provided via the associated modem of the test receiver 12, the information channel cognitively offset in frequency is displaced back to a suitable frequency. In this context, this frequency does not necessarily have to be the original frequency transmitted to the base station 1. Both the repeater 5 and the repeater 10 receive the corresponding information for the "synchronization" of the cognitively converted frequencies from the respective test receivers 6, 12.

The repeater 10 optionally also comprises, as means for suppressing a feedback 116, an adaptive filter 117 which suppresses feedback effects from the radiated signals in the signal conducted through.

The two information channels now preferably overlapping spectrally are radiated via in-house antennas 13a, 13b into a highly dispersive indoor area 14 of a building or of a cabin. A MIMO terminal 15 located in the indoor area 14 can then receive these communication signals.

In the indoor area 14, the MIMO technology can be fully exploited with regard to its possibilities for increasing the data throughput. The MIMO signals sent out via several antennas 13a, 13b are only weakly correlated with high probability due to the strong dispersal.

A special feature of the communication network 100 shown in FIG. 1 is the fact that the terminal 15 does not require any knowledge about the cognitive frequency offset for the communication between the two repeaters 5, 10.

In particular, the information about the local and temporary utilization of the frequency range available for mobile communication as determined by means of the test receivers 6, 12 is made available to the central database 115 via the modem connection described before. This improves the coordination with other radio services. Thus, poorly occupied frequency bands can be selectively used for increasing the transmission capacity via the test receivers 6, 12 and the converting devices 101, 103 connected thereto. In particular, transmission capacities can be bundled in individual frequency ranges, others can be relieved or completely disconnected. By activating or deactivating entire transmission branches, the energy consumption of the communication network can be optimized overall to suit the demand.

As an alternative, instead of a repeater 5 coupled directly to a base station 1 according to FIG. 1, it is also possible to make the base station 1 itself cognitive. This variant of the embodiment is shown in FIG. 2.

Figure 2:
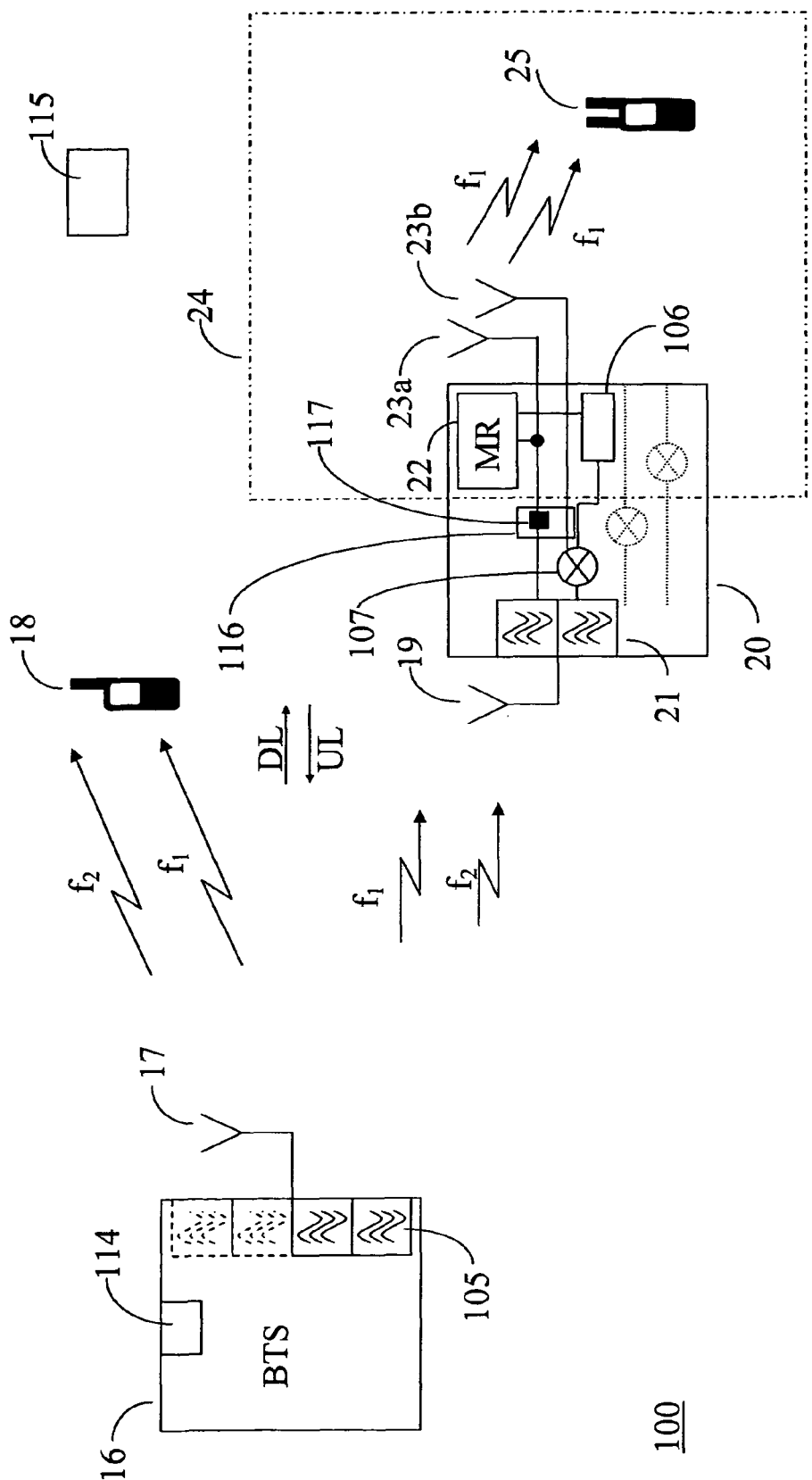
FIG. 2: diagrammatically shows a communication network with a cognitive base station, a MIMO-capable terminal and a repeater which transforms between information channels cognitively offset in frequency of the communication signal and MIMO-capable information channels.

The communication network 100 according to FIG. 2 comprises a cognitive base station 16 which has a further converting device 114 for the cognitive frequency conversion of the communication signals. The multiple information channels cognitively converted in frequency are radiated via a common antenna 17. Correspondingly, two frequencies $f_1$ and $f_2$ are drawn for this. The multi-frequency information channels are here conducted via a combiner or multiplexer 105 in the base station 16.

Apart from the direct reception of the information channels, offset cognitively in frequency, by means of a cognitive terminal 18, these information channels can also be received with the antennas 19 of a repeater 20. The repeater 20 according to FIG. 2 is equipped corresponding to the repeater in FIG. 1. Instead of using a common antenna 19, the multi-frequency information channels can also be received via separate antennas.

In order to be able to utilize the MIMO technology via the repeater 20 in the indoor area 24 of a building or of a cabin, the base station 16 receives the information to provide the multiple information channels, cognitively offset in frequency, with a corresponding MIMO coding. The signals thus coded are received via the information channels at the repeater 20.

One of the information channels is reset in its frequency by means of the converting device 106 and the associated frequency mixer 107, the relevant information with regard to the cognitively selected frequency being provided by the test receiver 22 or its associated modem, respectively. MIMO signals are radiated in the indoor area 24 via two antennas 23a and 23b. The MIMO-capable terminal 25 is able to receive the MIMO signals.

In the communication network 100 according to FIG. 2, the base station 16 and the repeater 20 are tuned to one another with respect to the cognitive frequency conversion. The repeater 10, too, optionally comprises, as means for suppressing a feedback 116, an adaptive filter 117 which suppresses feedback effects from the radiated signals in the signal conducted through.

Figure 3:
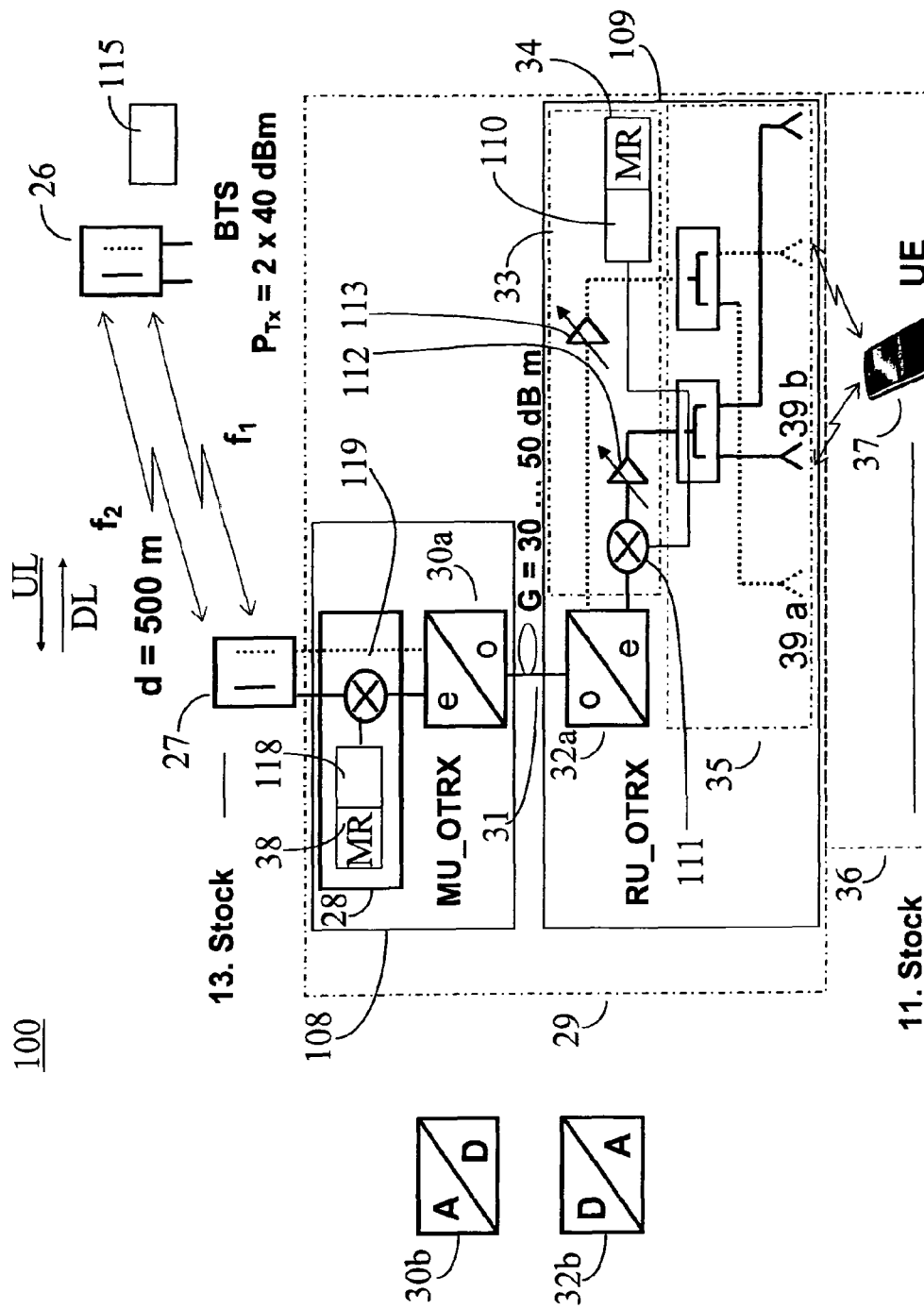
FIG. 3: diagrammatically shows a communication network with a multiband transmission system to an in-house supply.

According to FIG. 3, a multiband transmission system 29 can be integrated into the communication network 100 for distributing the communication signals in the indoor area. This multiband transmission system 29 comprises a master unit 108 and at least one remote unit 109 which are connected to one another via one or more signal lines 31. In this arrangement, the master unit 108 receives signals of a base station 26, bundles the multiple information channels with individual frequency conversion for avoiding interferences and by adding further information channels such as, e.g., from a digital network or other communication signals, to the common signal line 31. In the or each remote unit 109, the multiple information channels are separated, reset in frequency, amplified and sent out via antennas 39a, 39b. A distribution of the communication signals is possible via several remote units 109, e.g., via several stories of a building or in several cabins. In each story, the terminal 37 then communicates with the antennas 39a, 39b of the in each case associated remote unit 109.

According to FIG. 3, two or more frequency-offset signals are radiated by a base station 26. In this context, the base station 26 can be constructed as MIMO-capable base station 1 with a downstream repeater according to FIG. 1 or already as cognitive base station 16 according to FIG. 2. After the transmission via the air interface in the outdoor area, the communication signals sent out by the base station 26 can be received with the aid of the antenna receiver 27 of the master unit 108. The communication signals received by the antenna receiver are, in particular, at least two MIMO signals cognitively converted to different frequencies.

A pick-up repeater 28 of the master unit 108 converts the received multiple information channels by means of a frequency mixer 119 initially into frequencies which are of advantage for a transmission in the multiband transmission system 29. A multiband transmission system 29 is explicitly shown in which the incoming information channels are converted in the master unit 108 into their optical manifestation with the aid of an electro-optical transducer 30a before their transmission in the common signal line 31 after the frequency conversion. The very small cross section and the almost lossless signal transmission enable the strong radio field attenuation to be overcome especially in complex building structures.

For the purpose of frequency conversion, the pick-up repeater 28 also comprises a test receiver 38 and a converting device 118 to which the frequency mixer 119 is allocated. The test receiver 38 receives information about the presently performed cognitive frequency conversion of the MIMO signals, for example via a central database 115 or by a separate radio signal.

This information is used in the multiband transmission system 29 especially for further distribution and allocation of the frequency-multiplexed information channels. Similarly, the test receiver 38 is used for obtaining information about the available or unused frequency ranges in the outdoor area. This information can be made available to the central database 115 so that a cognitive frequency conversion, especially of the spatially multiple MIMO signals into the unused frequency ranges found or existing, can be carried out in the uplink direction.

Furthermore, after the optical distribution of the frequency-multiplexed information channels, these are reconverted into the selected radiowave range by means of an opto-electrical transducer 32a in the remote unit 109 in the downlink direction.

According to FIG. 3, the information channels converted cognitively with respect to frequency are converted in the respective remote unit 109. This comprises a cognitive repeater 33 which contains a test receiver 34, a converting device 110 and a frequency mixer 111. As described before, the converting device 110 resets the cognitively frequency-offset information channel by means of the frequency mixer 111 to a suitable frequency which, in particular, can be a frequency from the communication band of the base station 26. For this purpose, the test receiver 34 can access the central database 115 by means of the associated modem of the repeater 33 or is connected to the test receiver 38 of the pick-up repeater 28 via an information channel. The information channels received by the repeater 33 are presently amplified by means of amplifiers 112, 113 and radiated by means of different antennas 39a, 39b, for example via a passive distribution network.

According to FIG. 3, the communication channels transmitted by the base station 26 are MIMO signals. In other words, the multiple information channels contain codings for application of the MIMO technology. The spatially multiple information channels of the MIMO signals are transmitted separately via the at least two associated antennas 39a, 39b of the remote unit 109.

As an alternative to the multiband transmission system 29 with electro-optical transducers 30a, 32a, explicitly shown in FIG. 3, the transmission can be effected digitally on the common signal line 31 between master unit 108 and remote unit 109. In this case, master unit 108 and remote unit 109 have in each case analogue/digital converter units 30b and 32b, respectively.

Figure 4:
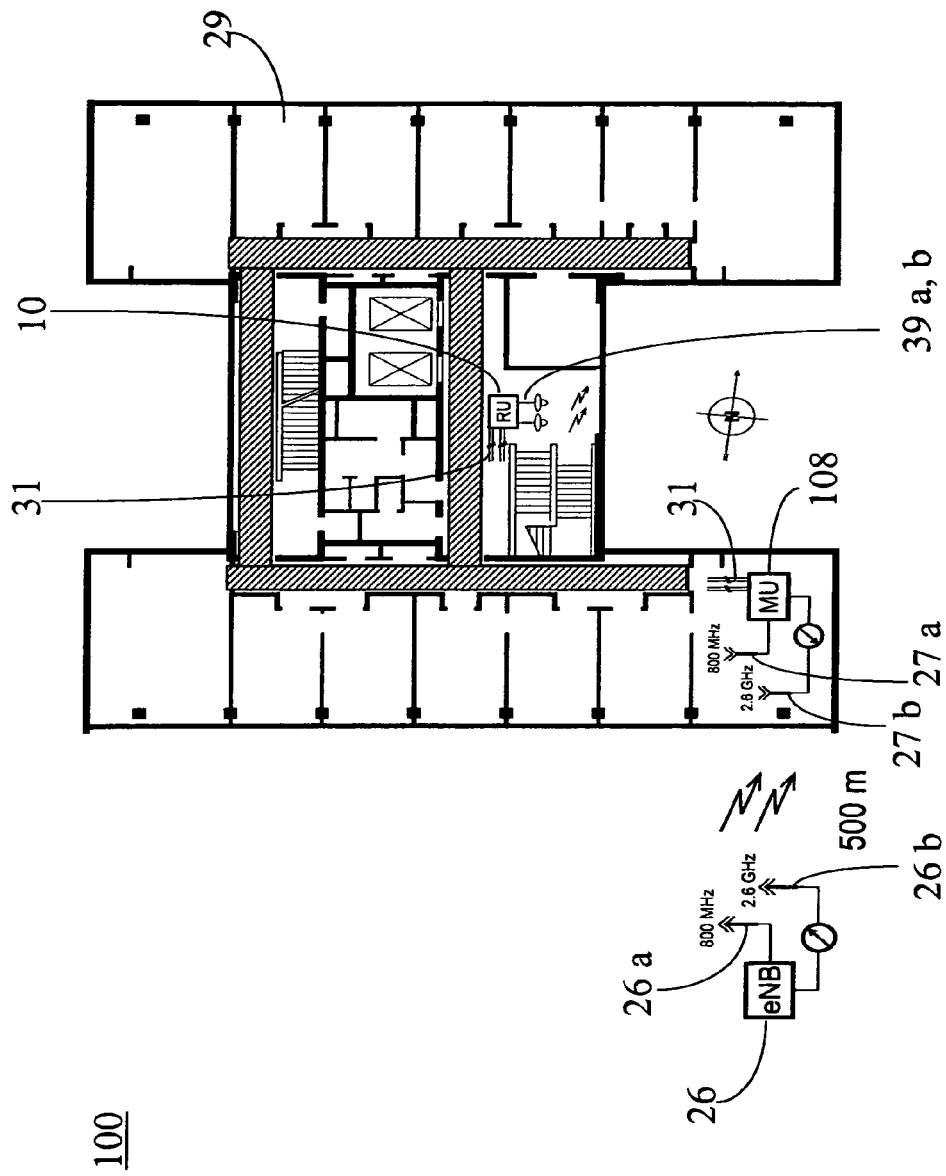
FIG. 4: diagrammatically shows the supply situation in the in-house area with the communication network according to FIG. 3, FIG. 5: shows distribution function curves, determined metrologically with different antenna arrangements, of the data throughput.

FIG. 4 shows the supply situation for mobile communication in a building, the linkage to a base station in the outdoor area being effected via a multiband transmission system 29 similar to FIG. 3. In the outdoor area, a cognitive base station 26 is provided which, for example, transmits and receives communication signals on multiple information channels via the antennas 26a and 26b in the 800 MHz and 2.6 GHz frequency bands within the LTE standard. In particular, the base station 26 is constructed to send out originally equal-frequency information channels cognitively offset in frequency, as in the case of a MIMO system, via the two antennas 26a, 26b. In the indoor area, the information channels are reset again in frequency or correspondingly offset again and sent out with equal frequency via two antennas 39a,b and received by a terminal. In this context, a cognitive frequency conversion of at least one of the equal-frequency signals (e.g. within the 2.6 GHz frequency band), for example into the frequency channels within the 800 MHz frequency band provided for terrestrial television, can be effected in the outdoor area. The equal-frequency radiation in the indoor area can then be effected in turn in the 2.6 GHz frequency band. As well, a cognitive conversion of at least one of these signals into an unused frequency range within the 2.6 GHz frequency band, e.g. into the range between 2570 and 2620 kHz provided for time division duplex (TDD) methods, can be effected in the outdoor area in the case of equal-frequency signals within the 800 MHz frequency band. In the indoor area, a radiation can then be carried out in the 2.6 GHz frequency band. In another alternative again, at least one of the equal-frequency signals in the outdoor area can be converted to an unused frequency within the frequency band between 2.4 and 2.5 GHz which is used for in-house wireless LAN.

Via antennas 27a and 27b, the master unit 108 receives, in particular, the cognitively frequency-offset information channels and converts them for transmission on a common signal line 31 according to FIG. 3. The distribution occurs via the common signal line 31 within the entire building. On each floor, there is a remote unit 109 which, after a resetting of the cognitively frequency-offset information channels, sends these out via antennas 39a and 39b. According to FIG.

3, the information channels offset in frequency for the common signal line 31 are restored into the radiowave range also in each remote unit 109.

In the present case, 2×2 MIMO signals were cognitively frequency-converted before their transmission in the outdoor area. In the indoor area, the data throughput was measured within the shaded corridor space after frequency resetting with a 2×2 MIMO-capable terminal 35 according to FIG. 2. It was found that the data throughput could be distinctly improved compared with a conventional communication network in which a MIMO-capable base station sends equal-frequency MIMO signals in the outdoor area. The restrictions with regard to the use of MIMO technology in the outdoor area are cancelled by a radio transmission under cognitive frequency conversion.

Figure 5:
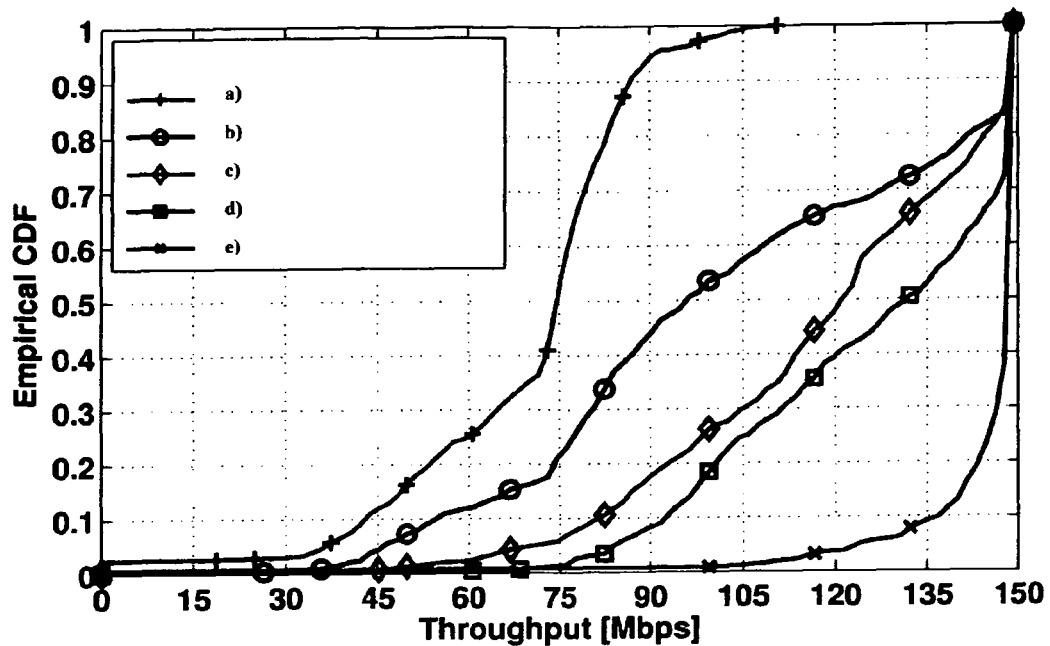
Figure 6:
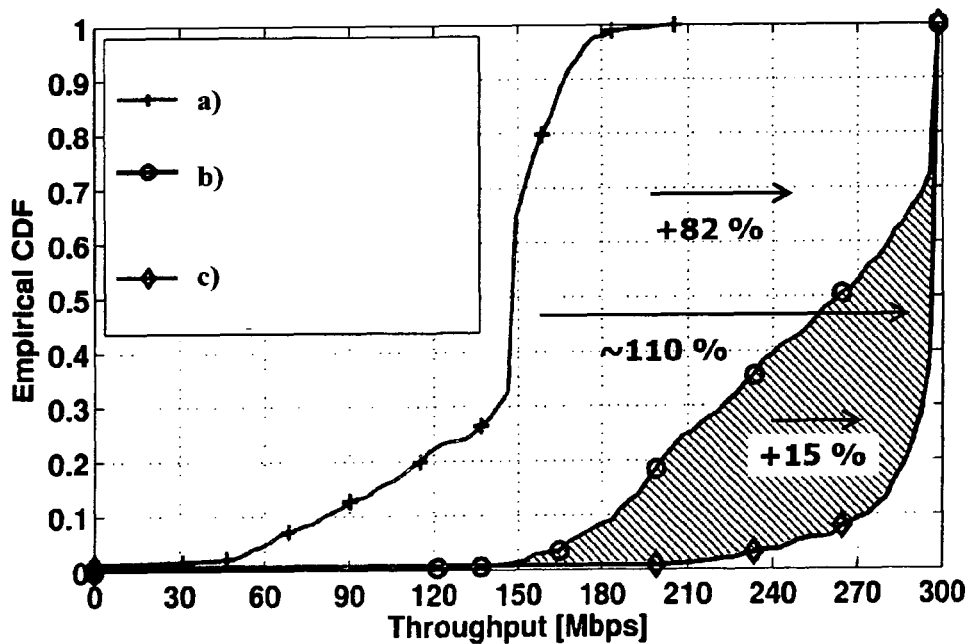
FIG. 6: shows the cumulative distribution function curves, extrapolated onto a 4×4 MIMO system, of the data throughput.

FIGS. 5 and 6 show distribution function curves (empirical CDF) determined for the data throughput in megabits per second (throughput [Mbps]) for various antenna and system configurations in each case measured at an LTE terminal along a measuring section comparable to FIG. 4. All measurement curves were recorded at a real building corresponding to FIG. 4 on the thirteenth floor.

The abbreviation CDF stands for Cumulative Distribution Function. The value of the distribution function for a parameter x specifies the probability with which the variable considered has a value of less than or equal to x.

The optimum data rate for a 2×2 LTE MIMO system having a channel bandwidth of 20 MHz is 150 Mbps. When the antennas are doubled and all antennas are optimally decoupled, the data rate for a 4×4 MIMO system increases linearly with the number of antennas and is thus 300 Mbps.

FIG. 5 shows measurement curves a), b), c), d) and e) for explaining the advantages of a frequency conversion for a 2×2 MIMO system. The original MIMO signals are of equal frequency, having a frequency within the 800 MHz frequency band. The MIMO signals are received by a MIMO-capable terminal in an inside room of a building.

Curve a) shows the throughput distribution using two copolarized antennas, arranged close to one another, of the base station. The MIMO signals are radiated at equal frequency directly from the outdoor area into the inside room. The identical polarization and the small spacing of the transmitting antennas leads to a very small angular spread and thus to a strong correlation between the two transmit streams. As a result, the data streams can no longer be decoded by a MIMO terminal in the inside room. The data rate at the terminal is thus halved and is below 75 Mbps in more than 50% of the cases according to FIG. 5, curve a). The high data rates of 150 Mbps cannot be achieved with this configuration. The data rates remain below 87 Mbps in 90% of the cases.

Curve b) shows the throughput distribution using in each case two cross-polarized antennas of the base station and of the repeater. The MIMO signals are radiated at equal frequencies from the outdoor area into the inside room. By using different polarization directions at the transmitting antenna, there is less interference between the two transmit streams, so-called inter-stream interference. The receive streams can thus be decoded with greater probability at the terminal. In general, the average data rate increases and is about 96 Mbps in 50% of the cases, above 100 Mbps in more than 46%.

The third curve c) was implemented with a test setup similar to FIG. 4, a transmit stream being received directly in an 800 MHz frequency band in the inside room of the building. A second transmit stream in a 2.6 GHz frequency band is received by a multiband transmission system according to FIG. 3, converted to the 800 MHz frequency band and radiated in the building. A MIMO signal is transmitted in the 800 MHz frequency band. The other MIMO signal is converted into the 2.6 GHz frequency band. The different data streams are assembled again at the LTE terminal. By using different frequencies at the base station, both signal streams can be transmitted into the building without inter-stream interference. In addition, the data stream converted from 2.6 GHz to 800 MHz can be amplified in the multiband transmission system. As a result, the achievable data rate at the terminal is about 121 Mbps in more than 50% of the cases. The data rate is over 100 Mbps in more than 75% of the cases.

The fourth curve d) shows the same test scenario as curve c), but with the use of other receiving antennas at the input side of the multiband transmission system. The so-called pick-up antenna used has an additional gain of 20 dB. As a result, the achievable data rate at the LTE terminal is about 132 Mbps in more than 50% of the cases. The data rate is over 100 Mbps in more than 82% of the cases.

The fifth curve e) shows a test setup similar to curve c), but the signal stream in the 800 MHz frequency band is also received by the multiband transmission system and conducted through and, if necessary, additionally amplified. The two data streams are assembled again at the LTE terminal. By using different frequencies at the base station, both streams can be transmitted into the building without inter-stream interference. In addition, both data streams are amplified. As a result, the achievable data rate at the terminal is about 148 Mbps in more than 50% of the cases. The data rate is over 100 Mbps in more than 99% of the cases.

Overall, it can be seen that the data throughput could be doubled by using the cognitive transmission methods.

FIG. 6 shows the test curves, extrapolated from FIG. 5, for a virtual 4×4 MIMO configuration. With optimum decoupling of all data streams, the data rate is scaled linearly with the number of transmitting and receiving antennas and is doubled to 300 Mbps in this case. In the text which follows, the individual curves a), b) and c) are described. By using antennas arranged in cross-polar fashion in the outdoor area, a doubled utilization of the transmission channel would be conceivable even without cognitive methods even in weakly dispersive environments. Adequate polarization decoupling is restricted to two antennas arranged perpendicularly with respect to one another. This restriction can be overcome with the aid of the communication network specified.

The first test curve a) shows the measured data rates with the assumption that four transmit streams in the 800 MHz frequency band are received directly at an input terminal having four receiving antennas or at two input terminals having in each case two receiving antennas, and are transmitted into the building. In this context, two dual-X-polarized transmitting antennas are used at the base station. Due to the fact that in each case twice the same polarization direction has to be used at the base station, there will be inter-stream interference, i.e. correlation between in each case two transmit streams. As a result, the total throughput becomes degraded in the system and is 150 Mbps in 50% of the cases. In 30% of the cases, a higher throughput than 150 Mbps can be achieved, the data rate remaining below 180 Mbps in 98% of the cases and no doubling of the data rate to 300 Mbps being achievable at any test point in the scenario.

In the test scenario for curves b) and c), the base station transmits four transmit streams via a dual-X-polarized antenna configuration as in the previous scenario, however by using two different frequency ranges, in this case within an 800 MHz and a 2.6 GHz frequency band. In other words, two of the four MIMO signals are converted into another frequency band. By using different frequencies, the transmit streams are now decoupled and there is no inter-stream interference. The multiband transmission unit receives all four transmit streams, amplifies them and transmits them after frequency reconversion in the 800 MHz frequency band. As a result, the full 300 Mbps can be brought into the building.

Curves b) and c) show the data rates which can be achieved at one in this case. According to curve b), a data rate of more than 260 Mbps can thus be achieved in 50% of the cases, in almost 30% of the cases it is even possible to achieve the peak data rate of 300 Mbps. This results in a distinct increase in comparison with the first scenario. The gain in throughput is 82% on average.

In curve c), the transmit power was raised by 20 dB in the building. In this case, the data rate of 295 Mbps can be achieved already in more than 50% of the cases, which corresponds to a gain in throughput of 15% with respect to curve 2. Overall, this results in an increase of 110% in comparison with the first curve.

LIST OF REFERENCE DESIGNATIONS

1 Base station, MIMO-capable
2 a,b,c,d Antennas
3 Terminal, MIMO-capable
4 a,b,c,d Bidirectional couplers
5 Repeater, cognitive, base station side
6 Test receiver
7 Multiplexer
8 Antenna
9 Antenna
10 Repeater, cognitive, terminal side
11 Multiplexer
12 Test receiver
13 a,b Antennas
14 Indoor area
15 Terminal, MIMO-capable
16 Base station, cognitive
17 Antenna
18 Terminal, cognitive
19 Antenna
20 Repeater, cognitive, terminal side
21 Multiplexer
22 Test receiver
23 a,b Antennas
24 Indoor area
25 Terminal, MIMO-capable
26 Base station, MIMO-capable
26 a,b Antennas of the MIMO-capable base station
27 Antenna receiver
27 a,b Antennas of the antenna receiver
28 Pick-up repeater
29 Multiband transmission system
30a Electro-optical transducer unit
30b Analogue/digital transducer unit
31 Common signal line
32a Electro-optical transducer unit
32b Analogue/digital transducer unit
33 Repeater, terminal side, converter
34 Test receiver
35 Distribution system
36 Indoor area
37 Terminal, MIMO-capable
38 Test receiver
39 a,b Antennas
100 Communication network
101 Converting device
102 Frequency mixer
103 Converting device
104 Frequency mixer
105 Multiplexer
106 Converting device
107 Frequency mixer
108 Master unit
109 Remote unit
110 Converting device
111 Frequency mixer
112 Amplifier
113 Amplifier
114 Converting device, base station
115 Database
116 Means for suppressing a feedback
117 Adaptive filter
118 Converting device
119 Frequency mixer

The invention claimed is:

1. A communication network for wireless communication comprising:
a base station configured for transmitting and receiving a communication signal on at least two equal-frequency MIMO-coded information channels;
a wireless terminal configured for transmitting and receiving a communication signal on at least two equal-frequency MIMO-coded information channels;
at least one repeater coupled between the base station and the wireless terminal, the repeater being configured for receiving, passing through and retransmitting communication signals on at least two equal-frequency MIMO-coded information channels and containing a converting device for frequency conversion of at least one information channel passed therethrough;
a test receiver configured for determining unused frequency ranges that are situated outside the frequency bands allocated to mobile radio for wireless communication, the test receiver being coupled with the converting device of the repeater and the converting device configured for carrying out frequency conversion in at least one communication direction (UL, DL) to a frequency from the unused frequency ranges situated outside the frequency bands allocated to mobile radio so that the MIMO-coded information channels are transmitted using different frequencies compared to each other;
the repeater being configured for transmitting the communication signal wirelessly with the at least one frequency-converted information channel in the at least one communication direction so that at least one frequency-converted MIMO-coded information channel is transported on a different frequency outside the frequency bands allocated to mobile radio.

2. The communication network of claim 1 wherein the base station comprises a further converting device for the frequency conversion of at least one information channel which is connected to the test receiver and is configured for carrying out the frequency conversion in the downlink direction to a frequency from the unused frequency ranges situated outside the frequency bands allocated to mobile radio, the converting device of the at least one repeater being configured for resetting the frequency of the frequency-converted information channel in the downlink direction (DL), and carrying out the frequency conversion of the at least one information channel into the frequency from the unused frequency ranges situated outside the frequency bands allocated to mobile radio in the uplink direction (UL).

3. The communication network of claim 1 further including, between the base station and terminal, at least two repeaters which are configured for receiving, passing through and retransmitting communication signals on multiple information channels, each repeater containing a converting device, connected to a test receiver,
for frequency conversion of at least one information channel passed through in at least one communication direction to a frequency from the unused frequency ranges situated outside the frequency bands allocated to mobile radio, the converting device of the repeater on a base station side being configured for carrying out the frequency conversion of the at least one information channel to the frequency from the unused frequency ranges situated outside the frequency bands allocated to mobile radio in the downlink direction (DL) and resetting the frequency of the frequency-converted information channel in the uplink direction (UL), and the converting device of the repeater on a terminal side being configured for resetting the frequency of the frequency-converted information channel in the downlink direction (DL), and carrying out the frequency conversion of the at least one information channel to the frequency from the unused frequency ranges situated outside the frequency bands allocated to mobile radio in the uplink direction (UL).

4. The communication network of claim 3, wherein the base station is a MIMO-capable base station and is configured for transmitting and receiving a communication signal on spatially multiple information channels, and wherein the repeater on the base station side is a MIMO-capable repeater which is configured for transmitting spatially multiple information channels in the uplink direction (UL) and receiving spatially multiple information channels in the downlink direction (DL).

5. The communication network of claim 3, the repeater on the base station side being connected to the base station via bidirectional couplers and exchanging the communication signals optically or electrically with the base station.

6. The communication network of claim 1 wherein the terminal is a MIMO-capable terminal which is configured for transmitting and receiving a communication signal on spatially multiple information channels, and in that the at least one repeater is a MIMO-capable repeater which is configured for transmitting spatially multiple information channels in the downlink direction (DL) and receiving spatially multiple information channels in the uplink direction (UL).

7. The communication network of claim 3 wherein a test receiver is allocated to a converting device, the test receivers being connected to one another and synchronized with regard to the frequency to be selected for the frequency conversion.

8. The communication network of claim 1 wherein the test receiver is connected to a central database which stores the frequency ranges unused for wireless communication that are situated outside the frequency bands allocated to mobile radio are stored.

9. The communication network of claim 1 wherein the test receiver comprises a spectrum analyzer.

10. The communication network of claim 1 the converting device being configured for carrying out no frequency conversion for at least one of the information channels.

11. The communication network of claim 3 wherein the at least one or terminal-side repeater is used for supplying a wireless network in an indoor space.

12. The communication network of claim 1 wherein the repeater includes electronic means for suppressing a feedback of the transmitted communication signal with the communication signal passed through.

13. The communication network of claim 12 wherein the means for suppressing a feedback comprise a digital adaptive filter.

14. The communication network of claim 1 further comprising:
a multiband transmission system including a master unit and at least one remote unit connected to the master unit via a common signal line;
the master unit being constructed for transmitting and for receiving communication signals on multiple information channels and for connecting and decoupling the multiple information channels to/from a transmission signal, the transmission signal being conducted via the common signal line, and the at least one repeater being constructed as a component of the remote unit.

15. The communication network of claim 14 wherein the master unit and the remote unit in each case comprise an opto-electrical transducer unit which converts the transmission signal between an electrical and an optical manifestation, the transmission signal being optically transmitted on the common signal line.

16. The communication network of claim 14 wherein the master unit and the remote unit in each case comprise an analogue/digital transducer unit which converts the transmission signal between an analogue and a digital manifestation, the transmission signal being digitally transmitted on the common signal line.

17. A communication network for wireless communication comprising:
a base station configured for transmitting and receiving a communication signal on at least two equal-frequency MIMO-coded information channels;
a wireless terminal configured for transmitting and receiving a communication signal on at least two equal-frequency MIMO-coded information channels;
at least one repeater coupled between the base station and the wireless terminal, the repeater being configured for receiving, passing through and retransmitting communication signals on at least two equal-frequency MIMO-coded information channels and containing a converting device for frequency conversion of at least one information channel passed therethrough;
a test receiver configured for determining unused frequency ranges, situated outside the frequency bands allocated to mobile radio for wireless communication, the test receiver coupled with a data base storing frequency ranges unused for wireless communication that are situated outside the frequency bands allocated to mobile radio, the test receiver being coupled with the converting device of the repeater and the converting device configured for carrying out the frequency conversion in at least one communication direction (UL, DL) to a frequency from the unused frequency ranges situated outside the frequency bands allocated to mobile radio so that the MIMO-coded information channels are then transmitted using different frequencies compared to each other;
the repeater being configured for transmitting the communication signal wirelessly with the at least one frequency-converted information channel in the at least one communication direction so that at least one frequency-converted MIMO-coded information channel is transported on a different frequency outside the frequency bands allocated to mobile radio.

* * * * *